(12) United States Patent
Williams et al.

(10) Patent No.: US 7,028,581 B2
(45) Date of Patent: Apr. 18, 2006

(54) ERGONOMIC HANDGRIP WITH SEPARATE ULNAR AND RADIAL SUPPORT MEANS

(76) Inventors: Thomas D. Williams, 1578 Eden Ct., San Diego, CA (US) 92078; Steven M. Gootter, P.O. Box 12026, Scottsdale, AZ (US) 85267

( * ) Notice: Subject to any disclaimer, the term of this patent is extended or adjusted under 35 U.S.C. 154(b) by 78 days.

(21) Appl. No.: 10/264,632

(22) Filed: Oct. 5, 2002

(65) Prior Publication Data
US 2004/0064868 A1  Apr. 8, 2004

(51) Int. Cl.
*B62K 21/26* (2006.01)

(52) U.S. Cl. ............... 74/551.9; 16/DIG. 12; D8/303

(58) Field of Classification Search .......... 74/551.9, 74/558, 558.5, 543; 16/430, DIG. 12; 81/177.1, 81/427.5, 487, 489, 492; 30/340–344, 329–336, 30/491, 517–525; 7/167, 168; 15/22.1–29
See application file for complete search history.

(56) References Cited

U.S. PATENT DOCUMENTS

| | | | |
|---|---|---|---|
| 366,775 A | 7/1887 | Jeffrey | |
| D144,446 S * | 4/1946 | Black | D8/303 |
| 2,425,245 A | 8/1947 | Johnson | |
| 2,877,018 A | 3/1959 | Turner | |
| 3,665,515 A | 5/1972 | Sjostrom, Sr. | |
| D241,806 S * | 10/1976 | Johnson | D8/303 |
| D248,616 S | 7/1978 | Johnson | |
| 4,186,924 A | 2/1980 | Southey | |
| 4,308,762 A | 1/1982 | Jannard | |
| 4,380,093 A | 4/1983 | Morgan | |
| 4,438,661 A | 3/1984 | Cullen | |
| 4,476,742 A | 10/1984 | Midgley | |
| 4,522,083 A | 6/1985 | Morgan | |
| 4,599,920 A * | 7/1986 | Schmid | 81/489 |
| 4,629,191 A | 12/1986 | Mancuso | |
| 4,641,857 A | 2/1987 | Gailiunas | |
| 4,875,386 A * | 10/1989 | Dickerson | 74/551.9 |
| 4,895,044 A * | 1/1990 | Ekins | 74/551.9 |
| 4,964,192 A | 10/1990 | Marui | |
| 5,031,640 A | 7/1991 | Spitzer | |

(Continued)

FOREIGN PATENT DOCUMENTS

DE        17 58 258 U     12/1957

(Continued)

Primary Examiner—Chong H. Kim
(74) Attorney, Agent, or Firm—Charles F. Reidelbach, Jr.

(57) ABSTRACT

The present invention consists of a new and unique ergonomic handgrip with separate ulnar and radial support means that divides the pressure between the heel of the hand and the thumb area along with removing the pressure in the central palmer crease at the joining of the wrist. This is accomplished by using a dog-bone shape with an ulnar or heel support area having a cavity conforming to the shape of the heel of the hand and a radial or thumb support with a cavity conforming to the shape of the thumb of the hand where it joins the wrist. The ulnar or heel support and the radial or thumb support are angled so as to keep the wrist in a neutral position in relation to the device and are divided by a median groove that blends up into the gripping area of the device. The median groove maintains a space between the device and the carpel tunnel or central palmer area of the hand. By adapting the conventional computer mouse to the shape of the ergonomic handgrip with separate ulnar and radial support means, some or all of the wrist pain can be eliminated.

6 Claims, 6 Drawing Sheets

U.S. PATENT DOCUMENTS

| | | |
|---|---|---|
| 5,333,515 A | 8/1994 | Schneider |
| 5,692,265 A * | 12/1997 | Dalury .................. 16/430 |
| 5,771,901 A | 6/1998 | O'Brien |
| 5,823,069 A | 10/1998 | Roark et al. |
| 5,868,365 A | 2/1999 | Hesley |
| 6,005,553 A | 12/1999 | Goldstein et al. |
| 6,118,062 A | 9/2000 | Thoman |
| 6,183,400 B1 * | 2/2001 | Pope ...................... 482/92 |
| 6,362,811 B1 | 3/2002 | Edwards et al. |
| 6,441,805 B1 | 8/2002 | Reid et al. |

FOREIGN PATENT DOCUMENTS

| | | |
|---|---|---|
| EP | 1 008 511 A1 | 6/2000 |
| GB | 2 184 012 A | 6/1987 |

\* cited by examiner

ERGONOMIC HANDGRIP WITH SEPARATE ULNAR AND RADIAL SUPPORT MEANS

FIELD OF THE INVENTION

This invention relates to a means for keeping the antebrachium or forearm and the carpus or wrist in a neutral position while holding or resting on an object for prolonged periods of time, along with removing the pressure on the carpel tunnel area. Too often the wrist is bent down, or more commonly up, with the weight resting on the central palmer area of the hand putting undue pressure on the ulnar and median nerve, causing temporary loss of feeling or permanent damage. The deep palmer arch and the superficial palmer arch of the arterial system to the phalanges or fingers also cross the palmer area of the hand. With concentrated pressure in the palmer area, the blood supply can be cut off to the fingers. Common problems occur with prolonged gripping of an object such as bicycle, motorcycle or other styles of handgrips. Construction tools and club grips such as hammers, golf clubs, garden implements and tiller handgrips put pressure on the central palmer area of the hand and can also cause numbing and tingling of the fingers after prolonged usage. Other areas with similar problems accrue in the field of computers, where an individual uses a computer mouse for prolonged periods of time resting on the ball of their hand with their wrist bent up and the pressure of the mouse on the central palmer area of the hand.

BACKGROUND OF THE INVENTION

This invention describes a new and unique ergonomic handgrip with separate ulnar and radial support means that divides the pressure between the heel of the hand and the thumb area along with removing the pressure in the central palmer crease adjoining the wrist. The inventors, being bicycle enthusiasts, have been very familiar with the fingers and hands going numb on long rides. Their initial intention was to cure the problem for bicycle enthusiasts and motorcycle riders by coming up with a new and unique ergonomic handlebar grip. Through their development and extensive research of the product they devised a unique shape that divides the pressure on the grip between the ball of the hand and the thumb area adjoining the wrist which completely removes any pressure on the carpel tunnel or central palmer area of the hand and wrist. Additionally, this invention provides a means to maintain the wrist in a more comfortable relaxed neutral position, not being bent up or down. Another unforeseen feature of this invention is the increased handgrip leverage and control with less operator effort due to extended contact points or ridges on the extremities of the heel or ulnar support area, and the thumb or radial support area. Many water sports vehicles like jetskis put a great deal of pressure on the central palmer area of the hand, and in the cold environment individuals often find their hands going numb.

These along with other unique features have not only solved the problems incurred with bicycle and motorcycle riding, but they have been found to be easily adaptable to other hand gripping devices. This is accomplished by using a dog-bone shape with an ulnar or heel support area with a cavity conforming to the shape of the heel of the hand and a radial or thumb support with a cavity conforming to the shape of the thumb of the hand where it joins the wrist. The ulnar or heel support and the radial or thumb support are angled so as to keep the wrist in a neutral position in relation to the device and are divided by a median groove that blends up into the gripping area of the device. It must be understood that the angle of the ulnar or heel support and the radial or thumb support may change to accommodate different positions of the hand and wrist and still remain within the scope of this patent. The median groove between the ulnar or heel support and the radial or thumb support maintains a space between the device and the carpel tunnel or central palmer area of the hand. With the ulnar or heel support area and the radial or thumb support area in the unique dog-bone shape supporting the wrist, the fingers and thumb have more than adequate gripping surface on the device. With the advent of this new and unique gripping means there will be the requirement of having a left and right hand model, along with varying sizes.

U.S. Pat. No. 5,031,640 of A. Robert Spitzer describes a cushion pad for preventing carpal tunnel syndrome and is adapted to be placed between the grip or shaft of a tool and a hand. The cushion pad includes a recess within a predetermined size range for protecting the median nerve by eliminating gripping pressure thereon. The cushion pad may be configured as a cylindrical grip attached to the tool or as a hand glove to be placed on the hand prior to grasping the tool. The cushion pad may include positioning flanges for positioning the median nerve over the recess. The 640 patent of Spitzer tells of a pad with a recess that wraps around the handle bar, grip or shaft of a tool in a cylindrical fashion and is designed to go across the hand beneath the knuckle area. It is not designed to spread the pressure across the base of the hand between the heel and the thumb area adjacent to the wrist.

U.S. Pat. No. 3,665,515 of John P. Sjostrom, Sr. teaches of a handlebar hand protector for the use on snowmobiles, bicycles, motorcycles and other devices having similar handlebars, comprising two flexible sleeves each having a narrow end and a wide end, the narrow end having a means of attaching to a handlebar allowing entry of a hand to grasp the handlebar within the sleeve. This device does not relieve the centralized pressure on the ulnar and median nerve included when an individual holds a tubular handgrip for a prolonged period of time.

U.S. Pat. No. 4,308,762 of James H. Jannard describes a lightened handgrip that contains hand engagable openings as in a flange and/or a grip body. In addition, a treaded pattern may be provided on the grip body. The 762 invention by Jannard describes a handgrip with a flange along the lower side with openings or orifices corresponding to the location of the fingers whereby when the handgrip is squeezed there is less resistance in these areas, allowing the grip to conform to the shape of the finger area of the hand. It does not relieve the pressure exerted on the central palmer or carpel tunnel area of the hand when the natural downward pressure is applied on the tubular upper section of the handgrip.

U.S. Pat. No. 4,438,661 of Fredrick T. Cullen discloses a protector for the hand of a rider on a bicycle or a motorcycle which is of semicircular shape having an arcuate midsection terminating at its opposite ends in retainers for detachably mounting on the handlebars of the vehicle about the hand grips thereof. The 661 invention of Cullen tells of a guard device for protecting the hands of a rider while holding onto a conventional tubular handgrip. These handgrips put undo pressure on the central palmer area of the hands of the rider.

U.S. Pat. No. Des 248,616 of George A. Johnson is a design patent that approaches the intentions of this herein-disclosed patent by adopting an extended portion to support the thumb area of the palm of the hand joining the wrist. The problem being that it still leaves the central tubular area that translates along the central palmer area of the hand putting pressure on the carpel tunnel area when pressure is exerted downwardly.

U.S. Pat. No. 5,823,069 of Michael A. Roark et al. This patent describes a method of making a handgrip including positioning within a mold cavity, with a tubular member having a sidewall with at least one opening in the sidewall, and injecting fluid resilient material into the cavity and between the tubular member and the core. The 616 invention of Roark discloses a unique manufacturing method of handgrips, but does not indicate anything other than a conventional circular handgrip design.

U.S. Pat. No. 5,771,901 of Virginia H. O'Brien discloses an ergonomic palm support. The arch support is comprised of a plate having support edges made to conform to the palm of the hand. The support bridges the palm between the thumb side and the little finger of the ulnar side of the palm of the hand and extends from adjacent the distal wrist crease to the palmar crease. The support is molded to fit partially around the thumb and a portion of the heel of the hand. The support is held in place with a glove or with fasteners. When gripping an object, such as a handle bar of a bicycle for example, the arch of the hand is supported to reduce ulnar and median nerve compression damage while the hand supports part of the upper body weight on the handlebars of a bicycle. The support is made of a sufficiently rigid material so that it will distribute the loads supported on the handlebars across a wider surface of the palm of the hand, particularly by spanning the carpel tunnel and Guyon's canal to avoid damage to the median and ulnar nerves. The 901 patent of O'Brien is endeavoring to solve the same problem as the soindisclosed patent by using a rigid structure within a glove to prevent pressure on the central palmer area of the hand, but does not maintain or support the wrist in the neutral position and does not involve a handgrip type of device.

U.S. Pat. No. 5,868,365 of William P. Hesley describes an ergonomic hand support for use with a computer mouse. This invention is a hand support device for use with a computer-pointing device. The 365 patent of Hesley tells of a cushion to be held adjacent to a conventional computer mouse and does not deal with the structural shape of the mouse or computer-pointing device.

U.S. Pat. No. 6,005,553 of Mark R. Goldstein et al. This ergonomic mouse allows for the operator's hand to remain in a relaxed position in as near a state of repose as possible while operating the mouse. The 553 invention of Goldstein tells of a generally spherical computer mouse with unique placement of the actuating buttons, but it does not have the central groove to relieve pressure on the carpel tunnel area or the support of the thumb or heel of the hand. This is still a universal mouse to be used by the individual in the left or right hand.

U.S. Pat. No. 6,441,805 of James J. Reid et al. describes an ergonomic computer mouse. A manually movable computer mouse with a mouse movement sensing system for providing mouse movement signals, and at least one user finger operable control switch, for providing control signals for a graphic user interface. The mouse has a boomerang shaped body ergonomically shaped to fit and support the user's hand in a naturally relaxed curled hand position, with a main body portion and a narrower neck portion extending at an angle of about 45 degrees to 90 degrees to the main body, narrow enough to be interposable between the thumb and first finger, with an integral mouse movement control fin or tab extending above the mouse body and being thinly shaped to fit in the relaxed space between the first and second fingers (and to also provide an alternate pen-like grip between the thumb and first finger) to orient the mouse to the users hand and move the mouse with user arm movements. An integral wrist support may be provided extending from the wrist end of the mouse. The movement sensing system is adjacent to that same end. The 805 patent of Reid tells of a unique structure for the actuating buttons and finger placement, but does not deal with the support of the palmer area and the elimination of the pressure on the carpel tunnel area of the hand. Additionally, this patent makes use of a trailer unit to be positioned by the operator and attached by means of a hook loop attachment. The trailer has a raised portion in the area of the central palmer crease that will actually increase on the carpel tunnel area.

Thus, there is a continuing need for improved gripping mechanisms to alleviate the pressure on the carpel tunnel area or central palmer crease of the hands of individuals involved in the prolonged gripping of such devices, as well as to maintain the wrist in its natural neutral position.

SUMMARY OF THE INVENTION

The preferred embodiment of this invention consists of a new and unique ergonomic handgrip with separate ulnar and radial support means that divides the pressure between the heel of the hand and the thumb area along with removing the pressure in the central palmer crease at the joining of the wrist. This is accomplished by using a dog-bone shape with an ulnar or heel support area having a cavity conforming to the shape of the heel of the hand and a radial or thumb support with a cavity conforming to the shape of the thumb of the hand where it joins the wrist. The ulnar or heel support and the radial or thumb support are angled so as to keep the wrist in a neutral position in relation to the device and are divided by a median groove that blends up into the gripping area of the device. The median groove maintains a space between the device and the carpel tunnel or central palmer area of the hand.

The ergonomic handgrip with separate ulnar and radial support means can be manufactured in metal, plastic, urethane or rubber, and will vary in duramater from being very flexible to being rigid and still remain within the scope of this patent.

The initial employment of the ergonomic handgrip with separate ulnar and radial support means will be in the form of left and right handgrips for motorcycles, bicycles and other devices with handlebars. This embodiment of the device will have an elongated tubular orifice translating through the center for the handlebar engagement. With the ulnar or heel support area and the radial or thumb support area in the unique dog-bone shape supporting the wrist, the fingers and thumb have more than adequate gripping surface on the central portion of the device for this application. The contours of this unique handgrip for bicycles, motorcycles and other devices with handlebars would not have the conventional tubular shape, but would be formed to fit the shape of the palm of the hand when it is wrapped around a cylinder. It will be elongated along the top edge at the distal end to fit between the thumb and first finger, preferably with depressions on either side for the gripping area of the thumb and fingers. Additional elongation of the distal end will be along the bottom surface where the thumb and first and second fingers meet. At the extended contact points or ridges on the extremities of the heel or ulnar support area, and the thumb or radial support area, more leverage and control is exerted upon the handgrip with less effort increasing the comfort while decreasing the physical exertion in the area of the hands.

The unique feature of spreading the support area while removing the pressure on the carpel tunnel or central palmer area has made this handgrip very desirable in the field of garden implements and equipment. Garden tillers often exert a great upward force on the hands of the operator when operated in rocky soils. These forces are directed through the handlebars into the hands and wrists of the operator. To spread these irregular forces over a broader area of the hand and removing it from the central palmer area will be a great advantage in the operation of these types of devices.

Many hand tools including hammers will benefit from the increased surface contact area to the hand and the added support of the ulnar or heel support and the radial or thumb support areas. Too often the area of the central palmer crease where it joins the wrist can be either temporarily or permanently damaged by the use of small hand tools with improper grips, as in lathe tools, chisels and files where pressure is exerted in this area of the hand.

With the advent of the computer-pointing device, more commonly known as a computer mouse, users are required to hold these objects for prolonged periods of time often causing wrist pain commonly called carpel tunnel syndrome. By adapting the conventional computer mouse to the shape of the ergonomic handgrip with separate ulnar and radial support means that divides the pressure between the heel of the hand and the thumb area along with removing the pressure in the central palmer crease at the joining of the wrist, some or all of the wrist pain can be eliminated.

An additional alternate embodiment of the ergonomic handgrip with separate ulnar and radial support means will have the ulnar or heel support area and the radial or thumb support area in the unique dog-bone shape supporting the wrist, omitting the orifice translating through the center of the handlebar engagement or the extended gripping means. This device will be used for a medical, athletic or workman's handbrace or protector to be attached to the hand by means of straps that translate over the back of the hand in preferably three separate locations. One strap will go over the radial or thumb area, one strap will go over the ulner or heel area and the third will go between the thumb and first finger, all joining on the back of the hand. The straps may be elastic or joined by means of conventional buckles and are attached to the ergonomic handgrip with separate ulnar and radial support means by three orifices in the perimeter of the device.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

It is therefore an object of the present invention to support the wrist while holding a handgrip with the arm and wrist in a natural unbent position.

It is another object of this invention to support the hand and wrist without putting pressure on the central palmer crease adjacent to the wrist or carpel tunnel areas of the hand.

It is a further object of this invention to create a left handgrip and a right handgrip with identical characteristics.

An even further object of the invention is to create handgrips that will be manufactured in varying sizes to accurately fit the hands of the user.

Even still another object of the invention is that it can be used in various applications ranging from bicycle and motorcycle handgrips, garden implements, golf clubs, and even on the computer mouse.

Lastly, it is an object of the present invention to create a handgrip that can be used for prolonged periods of time without the pain in the wrist area or the numbing or tingling of the fingers.

These together with other objects and advantages which become subsequently apparent, reside in the details of the construction and operation as more fully hereinafter described and claimed, reference being had to the accompanying drawings forming a part thereof, wherein like numerals refer to like parts throughout.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF THE PREFERRED EMBODIMENTS

Figure 1:
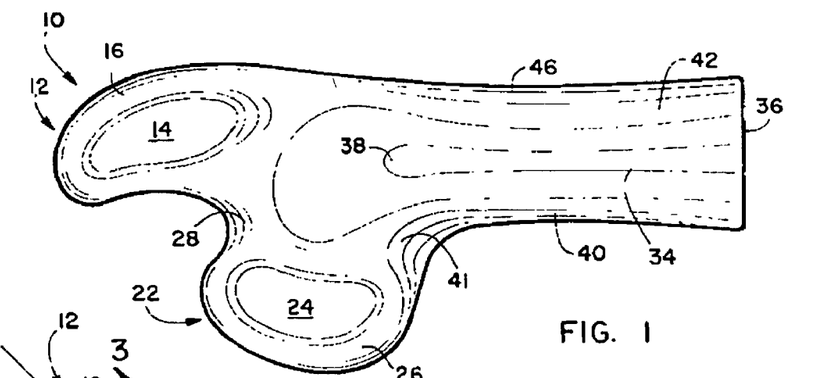
FIG. 1 depicts a plan view of the ergonomic handgrip with separate ulnar and radial support means.

Referring now to the drawings, wherein similar parts of the invention are identified by like reference numerals, there is seen in FIG. 1 a plan view of the ergonomic handgrip with separate ulnar and radial support means 10 positioned at a proximal end of a bicycle handgrip embodiment. The illustrations depicted within this disclosure are of a left handgrip only, with the full understanding that the right handgrip will be a mirror image with all the same disclosed embodiments and features, and still remain within the scope of this patent. The ulnar or heel support area 12 consists of an elongated concave cavity 14 that is surrounded by a ridge 16 supporting the ulnar or heel area 18 of a typical hand 20 (illustrated in FIG. 9). The radial or thumb support area 22 consists of a second elongated concave cavity 24 surrounded by a ridge 26 supports the radial or thumb area 29 of the hand 20 (illustrated in FIG. 9). The median groove 28 translates between the ulnar or heel support area 12 and the radial or thumb support area 22 creating a gap 30 (illustrated in FIG. 8), between the central palmer crease 32 and the median groove 28 of the ergonomic handgrip 10. It must be understood that the elongated concave cavity 14 of the ulnar or heel support area 12 and the elongated concave cavity 24 of the radial or thumb support area 22, illustrated as concave cavities, can also be orifices through the ulnar or heel support area 12 and radial or thumb support area 22 and still remain within the scope of this patent. The contoured upper handgrip ridge 34 extends from the distal end 36 of the ergonomic handgrip 10, terminating at a point 38 approximately two thirds of the way down the grip ridge 34 blending into the median groove 28. The side 40 of the ergonomic handgrip 10 adjacent to the radial or thumb support 22 is preferably contoured through the depression 41 and the length of the gripping area 42 to conform to the shape of the thumb 44. The side 46 adjacent to the ulnar or heel support area 12 is preferably contoured through the gripping area 42 to conform to the shape of the first finger 48, second finger 50, third finger 52 and the fourth finger 54 of the hand 20.

Figures 2, 3, 4, 5:
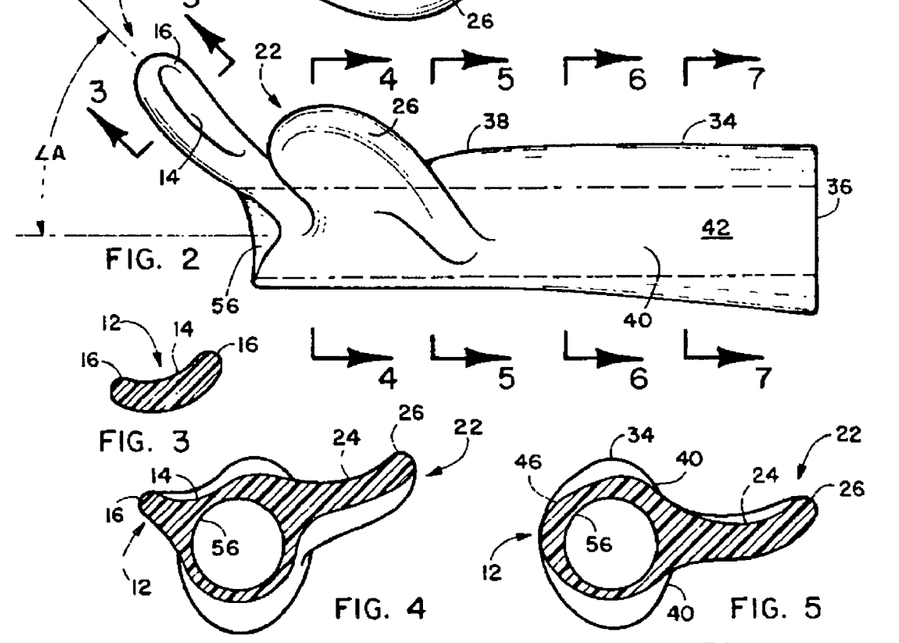
FIG. 2 depicts a side elevation of the ergonomic handgrip with separate ulnar and radial support means with the central dotted lines representing the handlebar orifice.
FIG. 3 depicts a section through the ulnar or heel support area of the ergonomic handgrip with separate ulnar and radial support means.
FIG. 4 depicts a section through the ulnar or heel support and radial or thumb support areas of the ergonomic handgrip with separate ulnar and radial support means.
FIG. 5 depicts a section through the central portion and the radial or thumb support area of the ergonomic handgrip with separate ulnar and radial support means.

FIG. 2 depicts a side elevation of the ergonomic handgrip 10 with the central dotted lines representing the elongated tubular orifice 56 for placement on the handlebar. Angle A, preferably 45 degrees, depicts the angle of inclination of the ulnar or heel support area 12 with respect to the center line of the handlebar orifice 56, with the radial or thumb support area 22 at a similar angle. The angle on the radial or thumb support 22 area will be similar to angle A on the ulnar or heel support area 12 with allowance to the twisting required to conform to the shape of the thumb 44 as it blends into the side 40 of the grip area 42. These angles may be adjusted up or down from 25 degrees to 75 degrees, together or separately to maintain a neutral or straight line 58 between the hand 20, wrist and forearm, illustrated in FIG. 8, without deviating from the scope of the patent.

Figure 9:
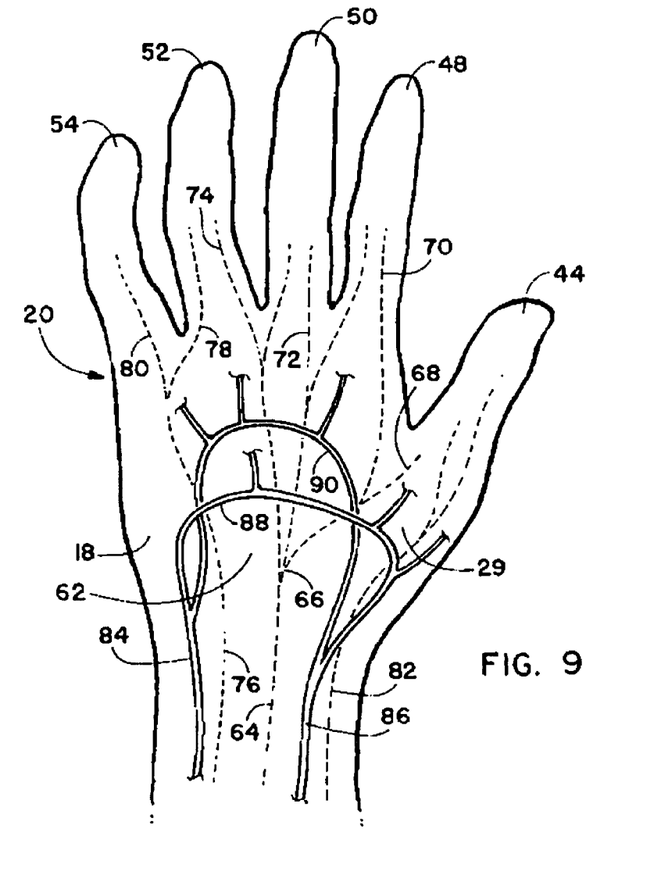
FIG. 9 depicts the right palm of a human hand.

FIG. 3 depicts a section through the ulnar or heel support area 12 of the ergonomic handgrip with separate ulnar and radial support means 10 clarifying the elongated concave cavity 14 that is surrounded by a ridge 16 supporting the ulnar or heel area 18 of the hand 20 shown in FIG. 9.

FIG. 4 depicts a section through the ulnar or heel support 12 and radial or thumb support 22 areas of the ergonomic handgrip 10, clarifying the transition of the upper surface of the contoured upper handgrip ridge 34 into the median groove 28 with respect to the handlebar orifice 56, and the elongated concave cavity 14 with the ridge 16 of the ulnar or heel support area 12. The radial or thumb support area 22 is shown on the right side with the concave thumb support cavity 24 and ridge 26 clearly depicted.

FIG. 5 depicts a section through the central portion and the radial or thumb support area 22 of the ergonomic handgrip 10 showing the radial or thumb support area 22 on the right side with the concave thumb support cavity 24 and ridge 26 with respect to the handlebar orifice 56.

Figure 6:
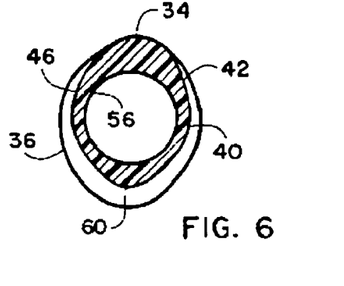
FIG. 6 depicts a section through the central portion of the ergonomic handgrip with separate ulnar and radial support means.

FIG. 6 depicts a section through the central portion of the ergonomic handgrip 10 illustrating the gripping area 42 with the contoured ridge 34 and the side 40 conforming to the thumb 44 and the side 46 conforming to the fingers 48, 50, 52 and 54 of the hand 20. The lower section 60 of the gripping area 42 is clearly depicted in an elongated state where the thumb 44 and fingers 50, 52 and 54 come together.

Figure 7:
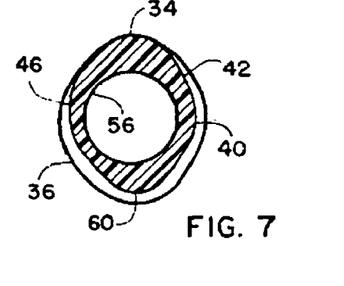
FIG. 7 depicts a section through the central portion approaching the distal end of the ergonomic handgrip with separate ulnar and radial support means.

FIG. 7 depicts a section through the central portion approaching the distal end 36 of the ergonomic handgrip 10 indicating the increased elongation of the contoured upper handgrip ridge 34 along with the increased elongation of the lower section 60 with respect to the handlebar orifice 56.

Figure 8:
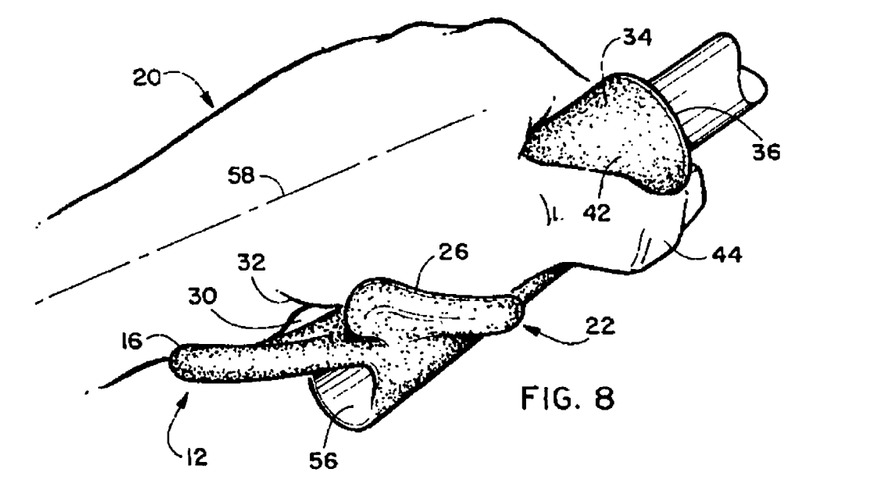
FIG. 8 is a perspective view of a left hand on a bicycle handlebar embodiment of the ergonomic handgrip with separate ulnar and radial support means.

FIG. 8 is a perspective view of a left hand 20 on a bicycle handlebar embodiment of the ergonomic handgrip with separate ulnar and radial support means 10 clearly showing the gap 30 between the median groove 28 and the central palmer crease 32 relieving the pressure on the carpel tunnel area 62 of the hand 20 when pressure is exerted on the ergonomic handgrip.

FIG. 9 is a diagram of the palm of a typical hand 20 indicating the locations of the ulnar or heel area 18 and the radial or thumb area 29 of the hand 20. The carpel tunnel area 62 of the hand 20 has the median nerve 64 branching at point 66 with cord 68 going to the thumb 44, cord 70 going to the first finger 48, cord 72 going to the second finger, and cord 74 going to the third finger 52. The ulnar nerve 76 translates through the ulnar or heel area 18 of the hand 20 to branch into the cord 78 in the third finger 52 and cord 80 in the forth finger 54. The radial nerve 82 translates through the radial or thumb area 29 of the hand 20 into the thumb 44.

The ulnar artery 84 and the radial artery 86 pass through the carpel tunnel area 62 to branch and join into the deep palmer arch 88 and the superficial palmer arch 90. It is made evident at this point that prolonged or repetitive pressure on the area of the carpel tunnel 62 of the hand 20 can cut off the blood supply to the hand 20 and fingers 48, 50, 52, and 54, along with pinching the median nerve cord 64 at the branching point 66 numbing the thumb 44, the first finger 48, the second finger 50 and the third finger 52. When the ulner nerve 76 is pinched the third finger 52 and the forth finger 54 will tingle or go numb.

Figure 10:
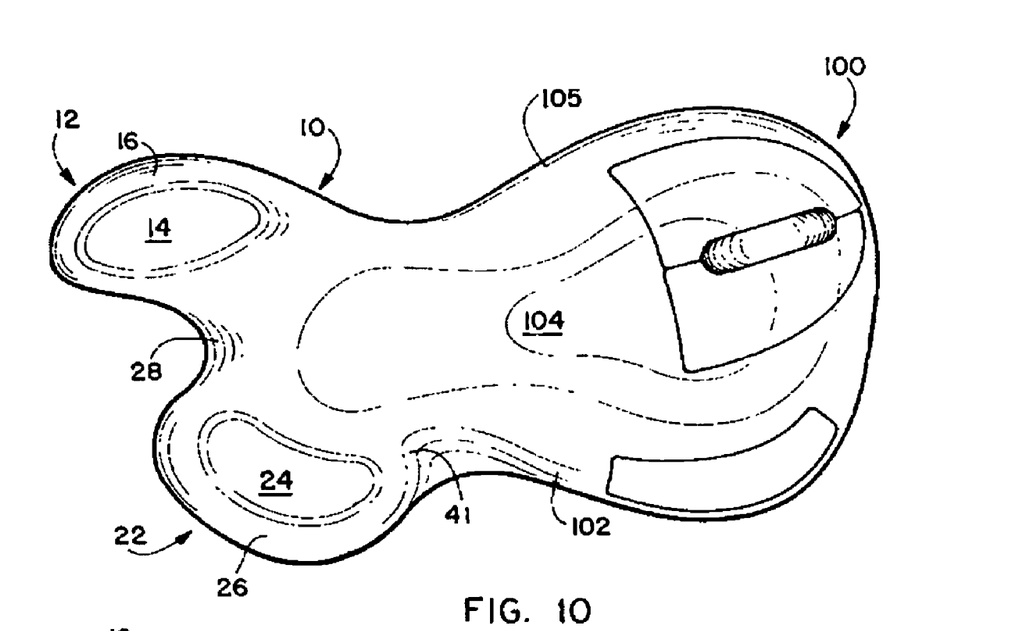
FIG. 10 depicts a plan view of a computer mouse adapted to the ergonomic handgrip with separate ulnar and radial support means.
Figure 11:
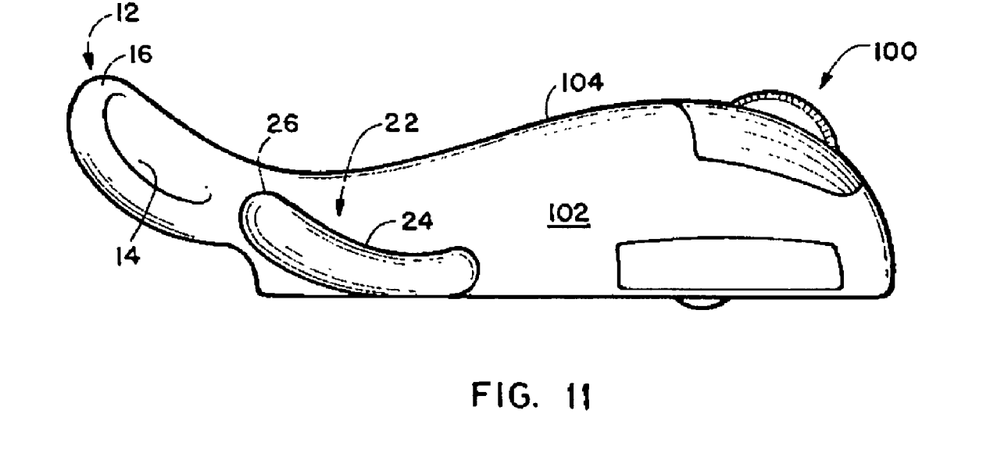
FIG. 11 depicts a side elevation of the computer mouse adapted to the ergonomic handgrip with separate ulnar and radial support means.

FIGS. 10 and 11 depict a plan view and side elevation of a conventional computer mouse 100 adapted to the ergonomic handgrip with separate ulnar and radial support means 10. The ulnar or heel support area 12, consists of an elongated concave cavity 14 that is surrounded by a ridge 16 supporting the ulnar or heel area 18 of a typical hand 20 as illustrated in FIG. 9. The radial or thumb support area 22 consists of a second elongated concave cavity 24 surrounded by a ridge 26 that supports the radial or thumb area 29 of the hand 20 illustrated in FIG. 9. The median groove 28 translates between the ulnar or heel support area 12 and the radial or thumb support area 22 creating a gap 30 illustrated in FIG. 8, between the central palmer crease 32 and the median groove 28 of the ergonomic handgrip 10. The thumb 44 adjacent to the wrist will rest in the elongated concave cavity 24 of the radial or thumb support area 22 and will continue through depression 41 and along the contoured thumb side 102 of the conventional computer mouse. The ulnar or heel area 18 of the hand 20 will rest in the elongated concave cavity 14 of the ulnar or heel support area 12 with the fingers 48, 50, 52 and 54 resting on the top 104 and the side 105 of the conventional computer mouse 100.

Figure 12:
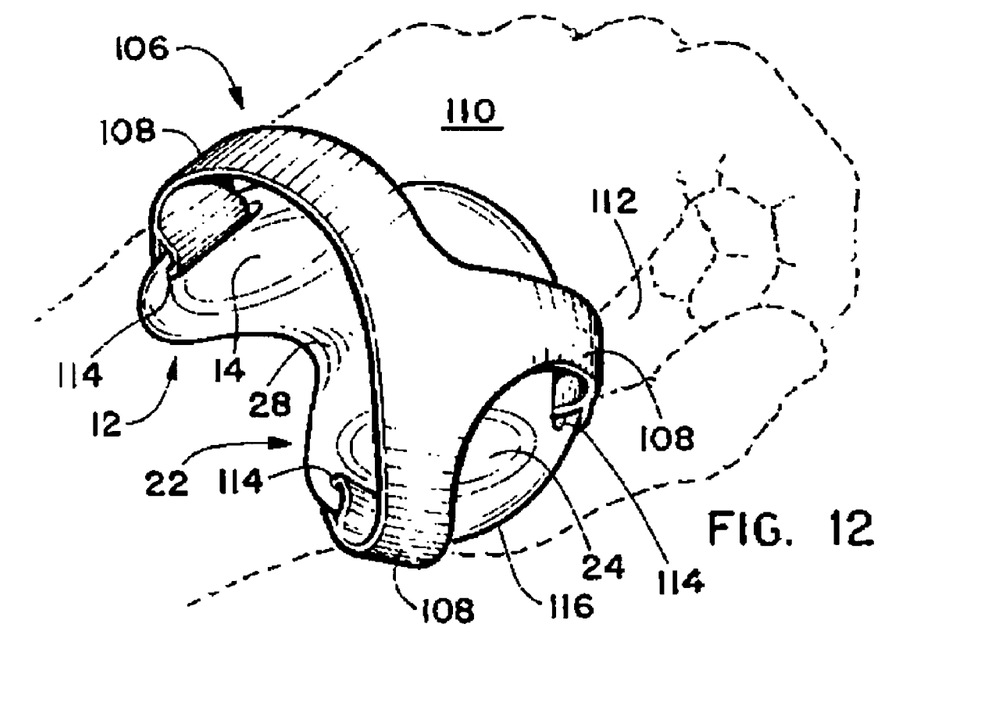
FIG. 12 depicts a perspective view from the back of a hand in phantom lines with the medical, athletic or workman's hand brace or protector.
Figure 13:
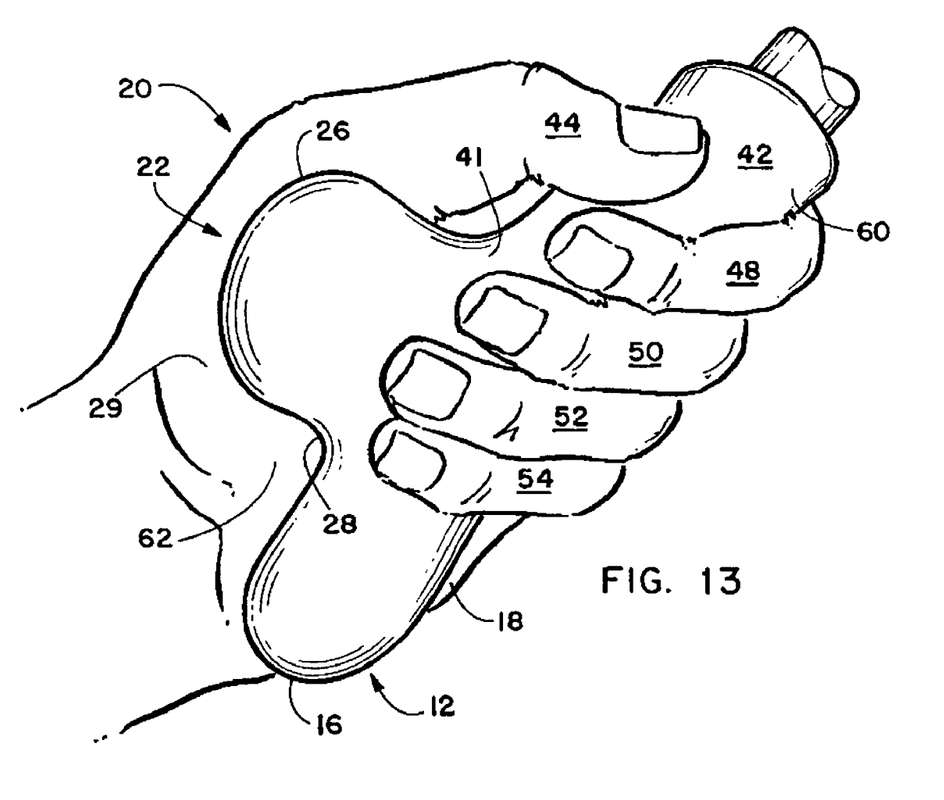
FIG. 13 depicts a perspective view of the ergonomic handgrip with separate ulnar and radial support means from the under side clarifying the orientation of the device to the palm of the hand.
Figure 14:
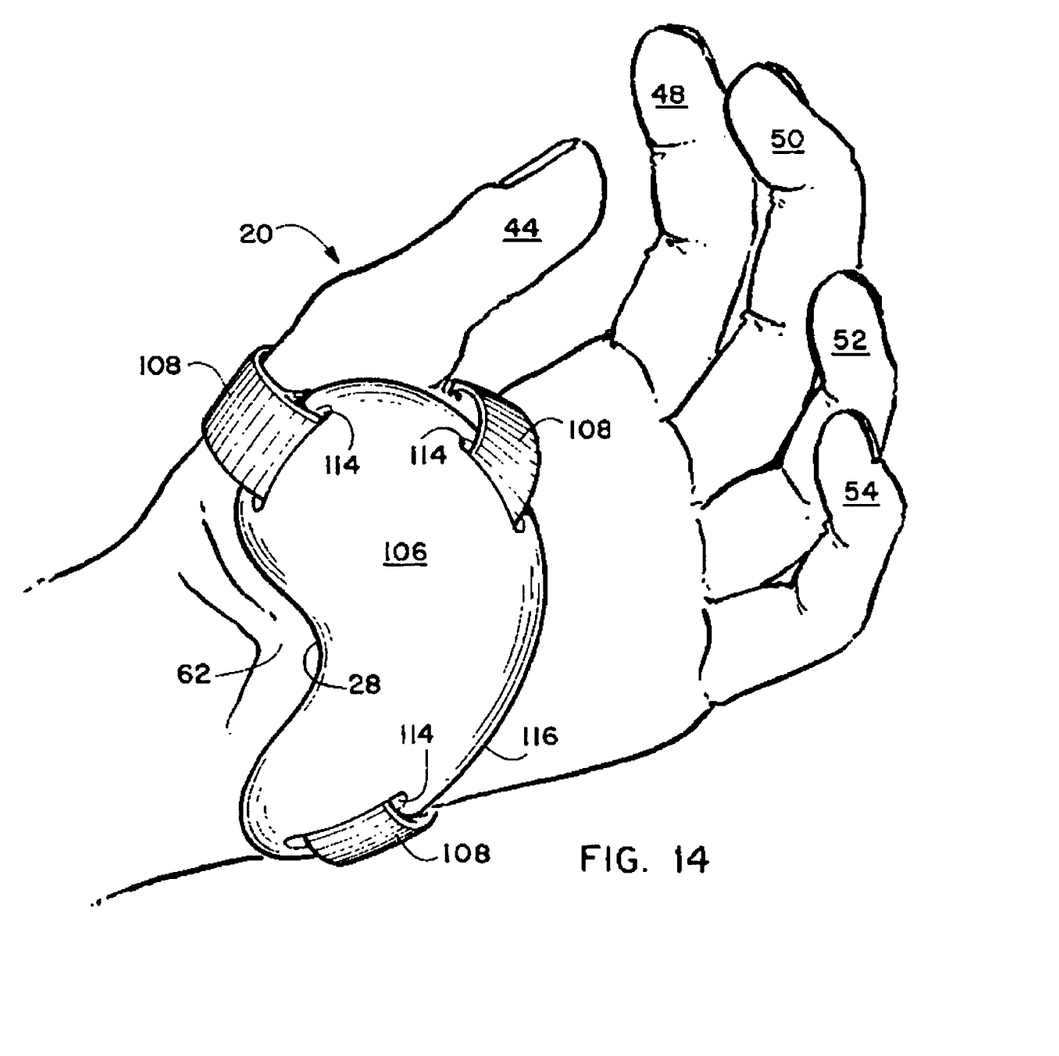
FIG. 14 depicts a perspective view of the alternate embodiment medical, athletic or workman's hand brace or protector clarifying the orientation of the device to the palm of the hand.

An additional alternate embodiment of the ergonomic handgrip with separate ulnar and radial support means 10 will have the ulnar or heel support area 12 and the radial or thumb support area 18 in the unique dog-bone shape supporting the wrist, omitting the orifice 56 translating through the center for the handlebar engagement or the extended gripping area 42. This device will be used for a medical, athletic or workman's hand brace or protector 106 to be attached to the hand by means of straps 108 that translate over the back 110 of the hand 20 in preferably three locations. One strap will go over the radial or thumb area 22, one strap will go over the ulner or heel area 18 and the third will go between the thumb and first finger 112, all joining on the back 110 of the hand 20. The straps 108 may be elastic or joined by the means of conventional buckles and are attached to the ergonomic handgrip with separate ulnar and radial support means 10 by three orifices 114 in the perimeter 116 of the medical, athletic or workman's hand brace or protector 106.

While the present invention has been described herein with reference to particular embodiments thereof, a latitude of modification, various changes and substitutions are intended in the foregoing disclosure, and it will be appreciated that in some instance some features of the invention will be employed without a corresponding use of other features without departing from the scope of the invention as set forth.

We claim:

1. An ergonomic handgrip device adaptable for use on a handlebar, comprising:
    a longitudinal housing having an orifice translating therethrough for engagement with a handlebar, said housing having distal and proximal ends;
    separate opposing heel and thumb supports consisting of cantilever ear-shaped members integrally formed in said housing at said proximal end for supporting the heel and the thumb of the user's hand; and
    a groove formed in said housing and translating between said heel and thumb support members for creating an inherent gap between the central palmer crease of the user's hand and the surface of the housing.

2. A handgrip device as recited in claim 1, further comprising a gripping area on said housing independent of said heel support and thumb support areas.

3. A handgrip device as recited in claim 1, wherein said heel and thumb support members are angled away from said orifice.

4. A handgrip device as recited in claim 3, wherein said heel and thumb support members are angled between 25 degrees and 75 degrees with respect to the centerline of said orifice.

5. A handgrip device as recited in claim 1, wherein said heel support member consists of an elongated concave cavity surrounded by a ridge for supporting the heel of the user's hand, and wherein said thumb support member consists of an elongated concave cavity surround by a ridge for supporting the thumb area of the user's hand.

6. A handgrip device as recited in claim 1, wherein said heel support member consists of an elongated orifice surrounded by a ridge for supporting the heel of the user's hand, and wherein said thumb support member consists of an elongated orifice surround by a ridge for supporting the thumb area of the user's hand.

* * * * *